Nov. 27, 1923 1,475,379

M. FOLKMAN

BUTTON FASTENER

Filed June 25, 1923

Inventor
Morris Folkman
By John A. Bommhardt
Att'y

Patented Nov. 27, 1923.

1,475,379

UNITED STATES PATENT OFFICE.

MORRIS FOLKMAN, OF CLEVELAND, OHIO, ASSIGNOR OF ONE-HALF TO FRANK J. CHALUS, OF CLEVELAND, OHIO.

BUTTON FASTENER.

Application filed June 25, 1923. Serial No. 647,527.

*To all whom it may concern:*

Be it known that I, MORRIS FOLKMAN, a citizen of the United States, residing at Cleveland, in the county of Cuyahoga and State of Ohio, have invented certain new and useful Improvements in Button Fasteners, of which the following is a specification.

This invention relates to buttons or studs, such for example as the studs used in shirt fronts, and has for its object to provide improved means for inserting the stud and for holding it in place after it is inserted. Said means comprise a stem or bar which can be swung to a position in line with the axis of the shank of the stud so that it may be readily inserted in the hole in the garment, and which then can be swung to position crosswise of said axis, and slid along to lock the stud in place.

Figure 1:
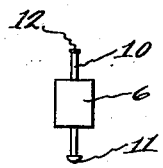
Figure 2:
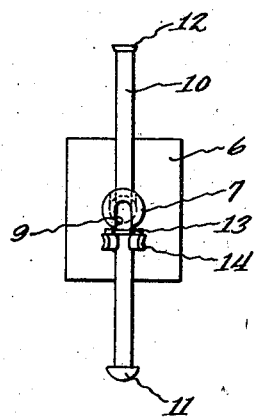
Figure 3:
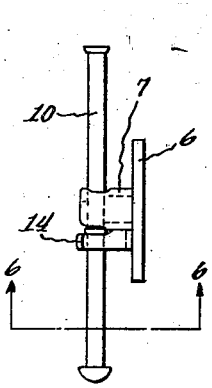
Figure 4:
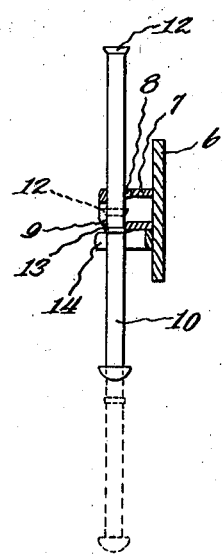
Figure 5:
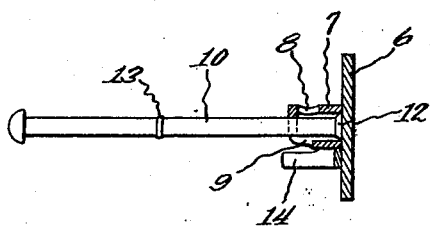
Figure 6:
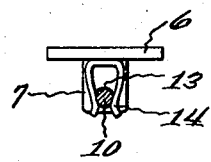

One form of the invention is shown in the accompanying drawings in which Fig. 1 is a plan or front view of the stud. Fig. 2 is a rear view. Fig. 3 is a side view. Fig. 4 is a longitudinal section with the stem in one position. Fig. 5 is a similar section with the stem in another position. Fig. 6 is a section on the line 6—6 of Fig. 3.

In the drawings 6 indicates the head or face plate of the stud, and this may be of any shape or construction desired. Attached to the rear thereof is a hollow shank 7 of proper size to fit within a button hole. At one side this shank has a hole 8, and at the opposite side it has a slot 9 which extends from the side of the shank to or across the end or axis of the shank, having, therefore a curved or arcuate form which permits the stem to swing, as hereafter explained.

A stem or bar 10 is mounted to slide across the shank, in the hole 8 and slot 9. At one end this stem has a pointed head 11 to be pushed through the button hole, and at the opposite end it has a shoulder or enlargement 12. The hole 8 is slightly greater in diameter than the shoulder 12, but the width of the slot 9 is slightly less than the diameter of the shoulder, so that the end of the pin can be drawn through the hole 8 into the inside of the shank, but will stop against the edges of the slot 9 so that it cannot be completely withdrawn. The stem 10 also has a small bead 13 which is larger than the width of the slot, and so prevents the stem being pushed through too far in the opposite direction.

Mounted on the head 6, opposite the stud 7, is a clip consisting of a pair of spring jaws 14 located in line with the slot 9, whereby the stem 10, when turned to position crosswise of the shank, may be pressed down between the jaws and thereby held against movement except by the application of special pressure.

In the use of the device, when the stud is to be inserted in a garment, the stem is pulled out as shown in dotted lines in Fig. 4 until the shoulder 12 passes through the hole 8. Then, the stem may be turned in the slot 9 to the position shown in Fig. 5, in line with the axis of the shank 7, in which position the stem and shank may be pressed into a button hole. Then, the stem is swung back to crosswise position in the slot 9, and is then slid along to the position shown in Figs. 2 and 3, which locks the stud in place, the bead 13 snapping through between the jaws 14 which thereby hold the stem in locked position until released as above described.

The invention is not limited, to the special form shown, but may be modified in various ways within the scope of the following claims.

I claim:

1. A button or stud comprising a head having a hollow shank provided on one side with a hole and on the other side with a slot, and an integral stem slidable crosswise of the shank, through the hole and the slot, to withdraw the end of the stem from the hole and permit the stem to swing in the slot to alinement with the axis of the shank, and a clip attached to the head and engageable with the stem when the latter is crosswise of the shank.

2. A button or stud comprising a head having a hollow shank provided on one side with a hole and on the other side with a slot, and an integral stem slidable crosswise of the shank, through the hole and the slot, to withdraw the end of the stem from the hole and permit the stem to swing in the slot to alinement with the axis of the shank, the stem having a bead preventing withdrawal of the stem from the slot.

3. A button or stud comprising a head having a hollow shank provided on one side with a hole and on the other side with a slot, and an integral stem slidable crosswise of the shank, through the hole and the slot, to withdraw the end of the stem from the hole and permit the stem to swing in the slot to alinement with the axis of the shank, the stem having a shoulder at one end smaller than the hole and larger than the width of the slot.

4. A button or stud comprising a head having a shank, a stem slidably and pivotally engaged with the shank, and a clip engageable with the stem when the latter is crosswise of the shank.

5. A button or stud comprising a head having a shank, a stem slidably and pivotally engaged with the shank, and a clip engageable with the stem when the latter is crosswise of the shank, the clip comprising a pair of spring jaws projecting from the head beside the shank and in line with the path of movement of the stem.

In testimony whereof, I affix my signature in presence of two witnesses.

MORRIS FOLKMAN.

Witnesses:
 JOHN A. BOMMHARDT,
 EDWARD J. HOBDAY.